H. L. DOHERTY.
APPARATUS FOR REMOVING SUSPENDED MATTER FROM GASES AND VAPORS.
APPLICATION FILED DEC. 31, 1909.

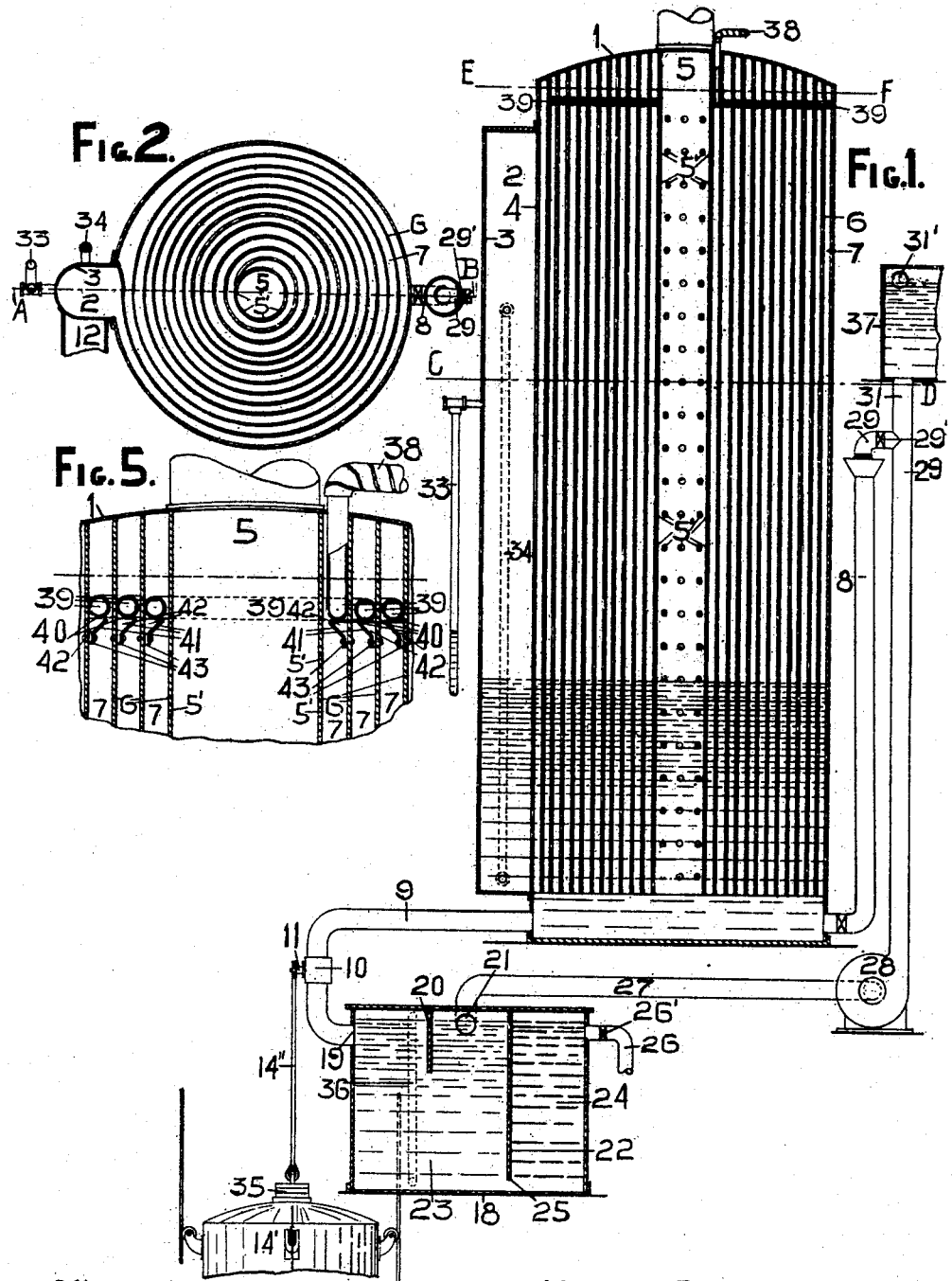

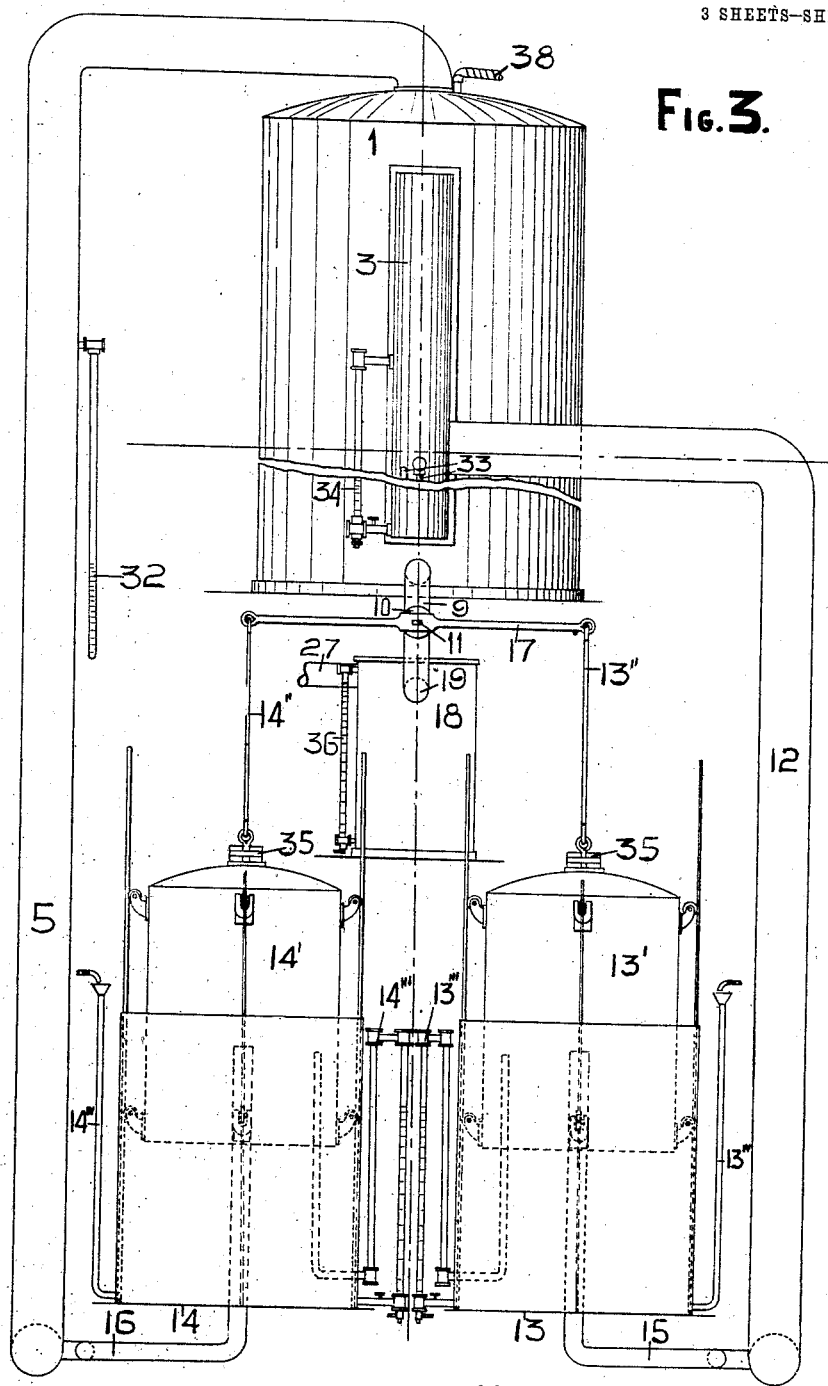

1,034,215.

Patented July 30, 1912.
3 SHEETS—SHEET 3.

Witnesses:

Henry L. Doherty, Inventor
By his Attorney

UNITED STATES PATENT OFFICE.

HENRY L. DOHERTY, OF NEW YORK, N. Y.

APPARATUS FOR REMOVING SUSPENDED MATTER FROM GASES AND VAPORS.

1,034,215.  Specification of Letters Patent.  Patented July 30, 1912.

Application filed December 31, 1909. Serial No. 535,842.

*To all whom it may concern:*

Be it known that I, HENRY L. DOHERTY, a citizen of the United States, and a resident of New York city, in the county of New York and State of New York, have invented certain new and useful Improvements in Apparatus for Removing Suspended Matter from Gases and Vapors, of which the following is a specification.

My invention relates to apparatus for removing suspended matter from gases and vapors and, particularly, to a type of such apparatus in which the gaseous current is caused to follow a spiral path.

The object of my invention is to provide a means for separating from a gaseous current, substantially all of the suspended liquid and solid particles, which it contains, with special reference to the removal of tar and dust particles from illuminating gas.

In my invention which is the subject of Letters Patent No. 798,667, dated Sept. 5, 1905, I have revealed an apparatus for accomplishing the above object by passing the gaseous current through a helical passage at a rapid rate, whereby a rapid rotary motion is given to the current and the suspended liquid and solid particles thrown off by the centrifugal force, so developed.

This present invention embodies an improvement on the one which is the subject of the Letters Patent, mentioned, by virtue of which I am enabled to communicate a whirling or angular motion to the gas current, while permitting each particle thereof to travel always in the same horizontal plane.

By this apparatus I am enabled to separate the suspended matter from the gas by the utilization of centrifugal force, and at the same time, avoid the relatively high pressure that is requisite for carrying out this method in my former apparatus.

Figure 4:
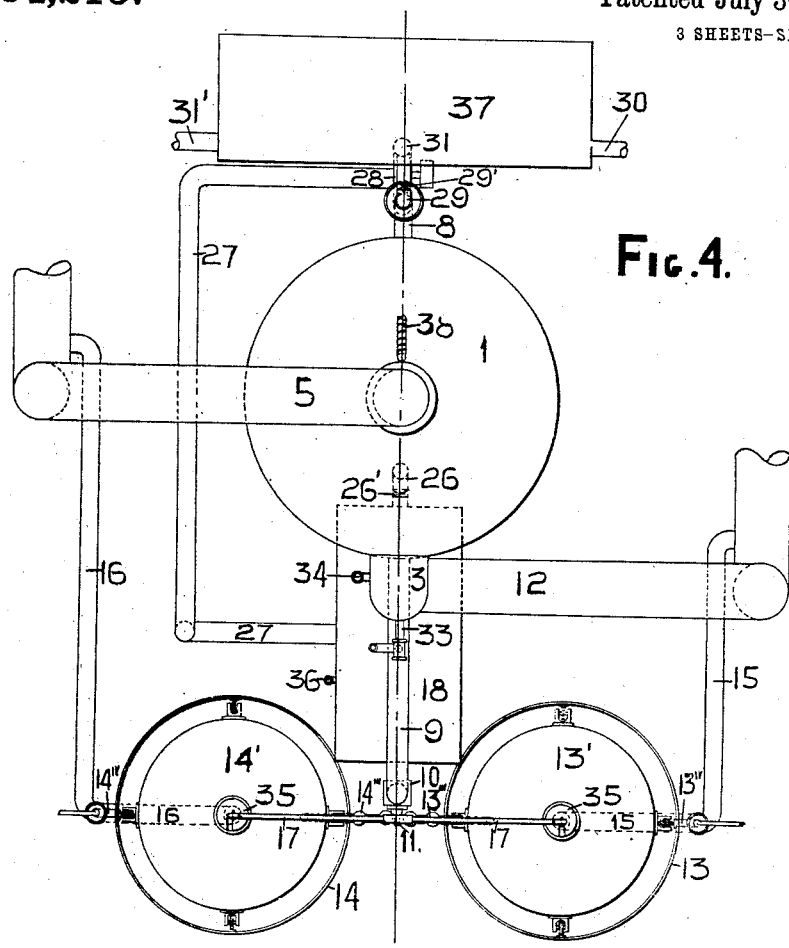
Figure 6:
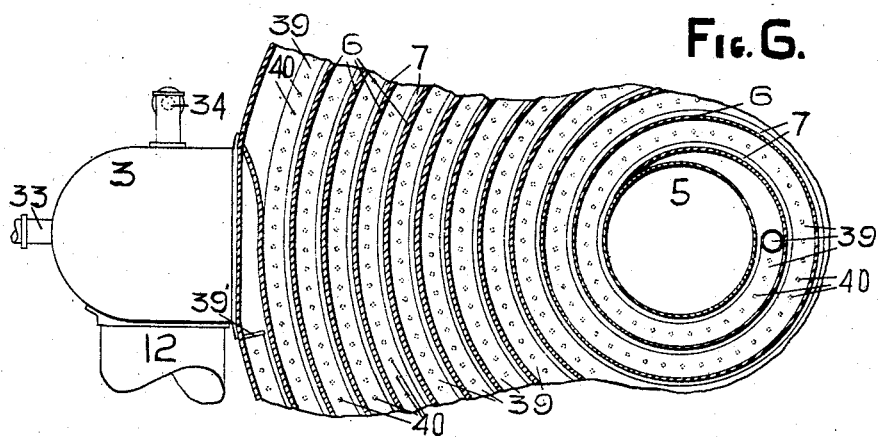

In the accompanying drawings, Figure 1 is a vertical diametral section through the apparatus on the line A B of Fig. 2; Fig. 2 is a horizontal cross-section through the same on the line C D of Fig. 1; Fig. 3 is an elevation of the apparatus, showing the device for regulating the water-level therein; Fig. 4 is a plan of the whole apparatus. Fig. 5 is a part diametral section of the upper portion of the separator similar to Fig. 1, but on an enlarged scale, showing the liquid supplying device; Fig. 6 is an enlarged part cross-section on the line E F of Fig. 1 showing the liquid-supplying device in top view.

In the several figures, 1 designates the separating chamber, proper. This is simply a cylindrical chamber, having attached to its wall a gas chamber 2, formed by riveting (or otherwise fastening) a curved sheet 3, to the outer shell of the chamber 1. A vertical slot 4 is cut in the shell of 1, so as to leave free communication between 2 and 1 at the periphery of the latter.

5, designates a perforated, vertical pipe attached to the top of 1 and terminating some distance from the bottom thereof.

6 is a continuous spiral partition attached to the top of 1 and terminating, like 5, some distance from the bottom of 1. The inner convolution of 6 encircles the pipe 5, while its outermost convolution is attached to the shell of 1 so as to leave the outermost convolution of the spiral passage, 7, formed within 1 by partition 6, in free communication with 2.

8, is a water (or other liquid) inlet communicating with the lower part of chamber 1 through which water is fed at, preferably, as uniform a rate as possible, to 1.

9, is a discharge for water (or other liquid) from chamber 1. The discharge through 9 is regulated by a quick opening cock or valve 10, which is preferably so constructed that the turning of the valve stem 11 through a complete quadrant will open or close 10. The movement of 11 through a small arc between its extreme positions of "open" or "shut" serves to regulate the rate of discharge of liquid from 1. A pipe 12, communicates with the chamber 2 for the admission or discharge of gas, according to the method of operation used. Small gas-holders, 13 and 14, respectively, are connected with pipes 12 and 5 by pipes 15 and 16, respectively. The respective lifts 13' and 14' of the gas holders 13 and 14 are connected to the rocking-arm 17 by links 13'' and 14'', respectively. The center or fulcrum of 17 is attached to the stem 11 of cock 10. By the suitable weighting of lifts 13' and 14' by weights 35 according to the pressure conditions prevailing in 5 and 12 (and according to the dead weights of the lifts) it is evident that they may be made to change their positions according to the magnitude of the pressure difference existing between 5 and 12. It is also evident that every motion of the lifts 13', 14' causes a rocking of the arm 17 with a consequent variation in the opening of cock 11.

18 is a well for separating the heavy tarry matter from the water or other liquid used as the seal in 1.

19 is the inlet into the tar separator 18, which receives the discharge from pipe 9.

20 is a baffle preventing the direct flow of liquid to the discharge 21 of 18. 22 is another baffle reaching nearly to the bottom of 18 and dividing the latter into two compartments, 23 and 24, communicating through the passage 25, between the bottom of 22 and of the well 18.

26 is the discharge pipe for tar from 18.

21 is connected with the suction pipe 27 of circulating pump 28, whose discharge is connected with pipe 29 discharging into the liquor inlet 8 of separator 1.

In order to maintain a substantially constant head of liquid on valve 29', so that the supply of liquid to 1 may be maintained uniform, the reservoir 37 is provided. This is connected to pipe 29 by connection 31 and has an overflow 31' through which any surplus liquid may be withdrawn from the system. The circulating pump is thus always discharging against the head of liquid in reservoir 37. When the liquid passing through the pump is below the normal quantity the deficiency is supplied by the liquid in 37. When the liquid passing through the pump, 28, is greater than the normal quantity, the excess passes through 31 to reservoir 37, thus again filling the latter. The reservoir 37 should be of such capacity that the fluctuations in the quantity of liquid discharging from 1 does not materially affect the level of the liquid in 37. Fresh water may be added to that in circulation, through the pipe 30, and any surplus liquor may be withdrawn from circulation through the pipe 31.

32 is a pressure gage on 5, and 33 a corresponding gage on 12. 34 is a water gage indicating the level of the liquid seal in 1. 13''' and 14''' are corresponding gages on 13 and 14, respectively.

10$^v$ and 14'$^v$ are connections for introducing the sealing liquid into the tanks of 13 and 14, respectively.

In operating my invention the gas may be passed through the spiral passage 7 either from the periphery to the center, or vice versa. Also, the draft through 7 may be either forced or induced as seems most desirable, the requirement being, simply, that there should exist a sufficient difference in pressure between 5 and 12 to impart the required velocity to the gas.

In the apparatus figured the method of operation is as follows: Water is supplied to 1 through the pipes 30 and 8, until the gage 34 shows that the proper quantity of water has been introduced to seal the passages 7 and 5. Cock 10 is now adjusted to its normal position and the circulating pump started. Additional water is run in from 30 until the normal quantity is in circulation. Valve 29' is adjusted so that liquid just fails to flow through pipe 31. The lifts 13' and 14' of gas-holders 13 and 14 are now connected up to the rocking bar 17 and gas turned on through the passage 12 under the necessary pressure. The gas enters the outer convolution of passage 7 and passes through 7 taking on a higher and higher angular velocity as it nears the center of the spiral. Arrived at the center of the spiral the gas passes through the openings or perforations 5' in 5 and thence leaves the separator 1 through 5, passing, usually therefrom, to the rest of the condensing and purifying train. During its passage through 5 the angular velocity communicated to the gas (or vapor) generates sufficient centrifugal force to throw the suspended liquid or solid particles (dust) to the periphery of the gas current and, therefore, into contact with the outer wall of the spiral. This soon becomes coated with a film of tar, which in turn assists in the removal of other tar from a fresh portion of gas. The simple projection of dust particles against a vertical wall would not effect their withdrawal from the gas current as the buoyant effect of the current of gas moving at a high velocity and the contact friction between the gas and dust would sweep the particles along even while in contact with the wall of the passage. The tarry liquid, however, possesses a considerable surface tension, and adheres to the wall with considerable tenacity—sufficient, in fact, to resist the tendency that the friction of the gas current has to sweep the deposited particles back into the current. This tarry film seizes the liquid globules and dust particles as they come in contact with the wall and withdraws them from the influence of the current of gas sweeping through the passage 7. As the deposit on the wall accumulates the outer layer forms innumerable rivulets which run off into the liquid seal in the bottom of 1. The force of adhesion between the tar and wall, however, suffices to keep the latter coated with a comparatively thick continuous film.

When the normal volume of gas is passing and the circulation of liquid is normal, the lifts 13', 14', of holders 13 and 14 are weighted so that the beam 17 is horizontal and the system is in equilibrium. If now the volume of gas supplied through 12, should increase, the tendency is for the pressure in 12 to rise. This causes the lift 13' of gas holder 13 to rise, rotating the arm 17, through a short arc from right to left. This increases the opening of cock 10, permitting an increased quantity of water (or other sealing liquid) to waste through 9. Since the quantity supplied through 8 is constant, the result is that the level of the sealing liquid in 1 drops until the clear, unsealed area of passage 7 is sufficient to accommodate the increased volume of gas passing without causing any increase in the normal difference in pressure between 12 and 5. The result is that the lifts 13', 14', of the gas holders resume their normal position, restoring the regulating cock 10 so that the discharge is again equal to the inflow. The level of the seal again remains constant as long as the conditions remain unchanged. If now the volume of gas passing falls the difference in pressure between 12 and 5 diminishes, causing the lifts 13' and 14' to shift their positions in the reverse direction. This tends to close the regulating cock 10, with the result that the level of the seal in 1 rises, diminishing the free area of passage 7 and thus again bringing up the difference in pressure between 12 and 5. When this difference has again reached normal, the holders return to their normal position again maintaining a constant level of seal in 1 as long as the volume of gas remains constant.

I do not herein claim this method of regulating the area of a gas passage according to the volume of gas passing therethrough as that will form the subject of another application.

The water flowing through 9, carrying the tar and other matter separated from the gas, discharges into the tar separator 18. Here the heavy tarry matter tends to settle to the bottom of 18 while the lighter portion of the liquid flows to the discharge 21. On starting the apparatus sufficient tar is introduced to seal the passage 25, until the level of the liquid has risen to the highest point. During the initial filling of the separator the liquid flows from one to the other of troughs 35 to the bottom of the tank and thus avoids the agitation of the tar seal. As the tar accumulates, by opening the valve 26' on the discharge 26 the surplus tar may be withdrawn from 18 as it accumulates and run to the storage well. By means of gage 36, the level of the tar in 23 can always be ascertained.

When the apparatus is to be used as a dust separator; or when there is a deficiency of tar in the gas treated, I supply the tar or other film-forming liquid through the pipe 38, to the spiral distributing pipe 39. This has perforations 40 in its bottom, and has its peripheral termination, 39', capped. The liquid supplied through 38 discharges through the perforations 40, and falls on the deflecting plate 41. This is simply a spiral sheet fastened to the spiral partition 6 as shown. 40 does not come into actual contact with 6 but is separated therefrom by spacers 42. The liquid falling on 41 discharges through the space 43 between 41 and 6 and runs down the latter wall as a continuous film. While tar is generally well adapted for the film-forming liquid, it is manifest that any other suitable liquid may be supplied through 38.

Having described my invention, what I claim is:

1. In an apparatus for separating from a gaseous fluid, matter suspended therein, the combination of a cylindrical chamber, a substantially vertical, continuous spiral partition in said chamber, the upper edge of said partition being fastened to the top of said chamber and its lower edge terminating in a liquid seal in the bottom of said chamber, whereby a continuous spiral passage is formed from the center to the periphery of said chamber, a gas conduit connected to the central extremity of said spiral passage, a gas conduit connected to the peripheral extremity of said spiral passage, and means for varying the level of the liquid seal in the bottom of said chamber according to the volume of gas passing through said chamber.

2. In an apparatus for separating from a gaseous fluid, matter suspended therein, the combination of a spiral passage for imparting an angular motion to said gaseous fluid, a perforated pipe communicating with the innermost convolution of said spiral passage, a gas chamber communicating with the outermost convolution of said spiral passage, a gas conduit communicating with said gas chamber, a liquid seal, sealing the bottom of said spiral passage, means for continuously supplying liquid to said seal, a passage for continuously withdrawing liquid from said seal, a valve on said passage for regulating the flow of liquid therethrough, and means for varying the degree of opening of said valve with the difference in pressure between the gaseous fluid entering said spiral passage and the gaseous fluid leaving said spiral passage.

3. In an apparatus for separating from a gaseous fluid, matter suspended therein, the combination of a separating chamber, a substantially, vertical spiral partition in said separating chamber, said partition having its upper edge fastened to the top of said separating chamber and its lower edge terminating in a liquid seal in the lower part of said chamber, whereby a continuous spiral passage is formed in said separating chamber, the free area of whose cross-section varies with the depth of the liquid seal in said chamber, a perforated pipe communicating with the innermost convolution of said spiral passage, a gas chamber communicating with the outermost convolution of said spiral passage, gas conduits connected, respectively, to said perforated pipe and said gas chamber, a pipe for continuously supplying liquid to the liquid seal in said chamber, a pipe for continuously withdrawing liquid from the liquid seal in said chamber, a regulating valve on the latter of said pipes, a rocking arm for actuating said valve, a gas holder having its lift connected to one extremity of said rocking arm and a gas holder having its lift connected to the other extremity of said rocking arm, a conduit establishing communication between the interior of the lift of one of the gas holders and the conduit conducting gas to said spiral passage, and a conduit establishing communication between the interior of the lift of the other of said gas holders and the conduit conducting gas away from said spiral passage, whereby the lifts of said gas holders are caused to have a compensating vertical motion in unison according to the difference in pressure between the gas in the said gas conduits.

4. In an apparatus for separating from a gaseous fluid, matter suspended therein, the combination of a separating chamber, a substantially, vertical, spiral partition in said separating chamber, said partition having its upper edge fastened to the top of said separating chamber and its lower edge terminating in a liquid seal in the lower part of said chamber, whereby a continuous spiral passage is formed in said separating chamber the free area of whose cross-section varies with the depth of the liquid seal in said chamber, a perforated pipe communicating with the innermost convolution of said spiral passage, a gas chamber communicating with the outermost convolution of said spiral passage, a gas conduit communicating with said perforated pipe and a gas conduit communicating with the said gas chamber, and means for varying the depth of the seal in said chamber, said means comprising a passage for continuously supplying liquid to said chamber, and a passage for continuously withdrawing liquid from said chamber, a regulating valve on the latter of said passages, and a means for returning all or part of the liquid passing through the latter of said passages to the first of said passages, a rocking arm for actuating said regulating valve, said arm having one end connected to the lift of a gas holder in communication with the conduit conducting gas to said spiral passage and its other end connected to the lift of a gas holder in communication with the conduit conducting gas away from said spiral passage, the lifts of said gas holders being so weighted that the said rocking arm will be in such position that the corresponding position of the regulating valve will permit of the discharge from said separating chamber of substantially the quantity of liquid that is being supplied to said chamber, when the normal volume of gas is passing through said spiral passage.

5. In an apparatus for separating from a gaseous fluid, matter suspended therein, the combination of a horizontal-spiral passage, adapted to impart an angular motion in a horizontal plane to the gaseous fluid passing therethrough, a gas passage communicating with the innermost convolution of said spiral passage and a gas passage communicating with the outermost convolution of said spiral passage, a cover closing the top of said passage and a liquid seal sealing the lower part of said passage, means for maintaining a continuous and uniform supply of liquid to said seal and means for maintaining a continuous discharge of liquid from said seal, means for varying the quantity of liquid discharging from said seal according to the difference between the pressure of the gas at its entrance to said spiral passage and the pressure of the gas at its exit from said spiral passage, whereby the depth of said seal is made to vary inversely with the volume of gas passing through said spiral passage and the free area of said passage made thereby to vary directly with the volume of gas passing through said spiral passage.

6. In an apparatus for separating from a gaseous fluid matter suspended therein, the combination of a horizontal-spiral passage adapted to impart an angular motion in a horizontal plane to the gaseous fluid passing therethrough, a gas passage communicating with the innermost convolution of said spiral passage and a gas passage communicating with the outermost convolution of said spiral passage, a cover inclosing the top of said spiral passage, and a liquid seal sealing the lower part of said passage, means for maintaining a continuous and uniform supply of liquid to said seal and means for maintaining a continuous discharge of liquid from said seal, means for varying the quantity of liquid discharging from said seal according to the difference between the pressure of the gas at its entrance to said spiral passage and the pressure of the gas at its exit from said spiral passage, means for separating from the discharged liquid the tarry matter contained therein, and means for returning all or part of the substantially tar free liquid to the seal.

7. In an apparatus for separating from a gaseous fluid, matter suspended therein, the combination of a cylindrical chamber, a substantially vertical, continuous spiral partition in said chamber, the upper edge of said partition being fastened to the top of said chamber and its lower edge terminating in a liquid seal in the bottom of said chamber whereby a continuous spiral passage is formed from the center to the periphery of said chamber, a perforated spiral pipe for supplying liquid located in the upper part of said spiral chamber, and following the convolutions thereof, a deflecting plate attached to the wall of said spiral passage but not in direct contact therewith, whereby there is left an opening between said plate and said wall for the passage of liquid, said deflecting plate being located immediately below said spiral pipe, a gas conduit connected to the peripheral extremity of said spiral passage, and means for varying the level of the liquid seal in the bottom of said chamber according to the volume of gas passing through said chamber.

Signed at New York city in the county of New York and State of New York this 20th day of December A. D. 1909.

HENRY L. DOHERTY.

Witnesses:
W. J. QUENFIN,
THOS. I. CARTER.